Nov. 24, 1953                D. P. BERNHEIM ET AL                2,660,011
                                LENS BLOCKING DEVICE
Filed Aug. 7, 1948                                          5 Sheets-Sheet 2

INVENTORS
DANIEL P. BERNHEIM
CARL G. SILVERBERG
BY
Louis L. Gagnon
ATTORNEY

Nov. 24, 1953 D. P. BERNHEIM ET AL 2,660,011
LENS BLOCKING DEVICE
Filed Aug. 7, 1948 5 Sheets-Sheet 3

INVENTORS
DANIEL P. BERNHEIM
CARL G. SILVERBERG
BY
ATTORNEY

INVENTORS
DANIEL P. BERNHEIM
CARL G. SILVERBERG

Nov. 24, 1953    D. P. BERNHEIM ET AL    2,660,011
LENS BLOCKING DEVICE

Filed Aug. 7, 1948    5 Sheets-Sheet 5

*INVENTORS*
DANIEL P. BERNHEIM
CARL G. SILVERBERG
BY
*Louis L. Gagnon*
ATTORNEY

Patented Nov. 24, 1953

2,660,011

UNITED STATES PATENT OFFICE 2,660,011

LENS BLOCKING DEVICE

Daniel P. Bernheim, Southbridge, and Carl G. Silverberg, Sturbridge, Mass., assignors to American Optical Company, Southbridge, Mass., a voluntary association of Massachusetts Application August 7, 1948, Serial No. 43,066

16 Claims. (Cl. 51—277)

This invention relates to improvements in blocking devices and has particular reference to improved means and method of blocking lenses.

One of the principal objects of the invention is to provide improved means and method of blocking semi-finished lens blanks whereby the positional factors of the finished prescriptive power which the lens is to possess may be located prior to the blocking and the said lens blank blocked while held in said located position.

Another object of the invention is to provide improved means and method of blocking lenses whereby the prism and cylinder axes and extent of said prism may be located prior to blocking the semi-finished lens blank and the said lens blank blocked while held in said position.

Another object is to provide improved sighting and gripping means for semi-finished lens blanks whereby the optical characteristics which the finished lens is to possess may be predetermined and the said lens blank held by said gripping means in such a manner as to retain its position with respect to its prescriptive characteristics, whereby it may be transferred by a slight vertical movement into alignment with and be secured to a lens block while held in said position.

Another object is to provide a device having means for supporting a lens blank, means for supporting a lens block on a vertical axis with said lens blank, an upright having sighting and gripping means vertically movable into and out of adjacent relation with the lens blank and adapted to position said lens blank with respect to said lens block.

Another object is to provide a device having means for positioning a lens blank with respect to the prescriptive characteristics which the finished lens is to possess, means for gripping and moving the lens blank vertically while held in said position, and means for returning the blank and attaching said blank to a lens block at substantially the same general location where it was originally positioned and gripped.

Another object is the provision of means for preliminary attaching adhesives in the form of pellets to blocks so that the blocks can be positioned in the blocking device with the adhesives firmly attached.

Another object is the provision of a furnace having suitable automatic time control for simultaneously attaching a plurality of adhesive pellets to a plurality of blocks.

Another object is the provision of a movable heating element positioned for insertion between a lens blank and a lens block carrying an adhesive to simultaneously heat the adjacent surfaces thereof before securing the blank to the block.

Another object is the provision of an electronic timing device for governing the heating cycle for the lens blank and lens block and controlling electrical mechanism for automatically removing the heating element from its position between the lens blank and lens block and automatically causing the means carrying the lens blank to deposit the blank upon the lens block and adhesive carried thereby.

The invention also consists of new and original features of construction and combination of parts hereinafter set forth and claimed. Although the novel features are shown and described and are pointed out in the claims, the present invention will be more clearly understood and the advantages thereof fully realized from the following description read in conjunction with the accompanying drawings, in which:

When blocking a lens for the forming of the final prescriptive surface on said lens it is of extreme importance that the said lens be located in properly centered position, and in instances wherein the said lens is to have a cylinder and prismatic correction embodied therein it is also of extreme importance that the axis of the cylinder and prism be located in the proper meridian and that the power thereof be accurately controlled.

An important feature of the present invention, therefore, is the provision of improved means and method whereby all of the positional and prescriptive characteristics which the resultant lens is to possess may be accurately determined prior to the final securing of the lens blank to the lens block so that the said lens blank will be held in proper position in the abrading machine employed to complete the final prescriptive surface on said blank.

A unique feature of the present device and method is that it eliminates all guesswork and insures that the accurate optical characteristics are being introduced during the final abrading of the prescriptive surface on the lens blank.

Although means and methods have been employed in the past for determining all the prescriptive components of a lens prior to the final positioning of the lens blank with respect to the lens block, it has been very difficult to provide suitable means for efficiently securing the lens blank to the lens block. One of the most satisfactory prior art devices was the type employing a pitch pot or kettle supported for positioning in alignment with the lens block to permit the flow of molten pitch from the kettle onto said lens block, the pitch having been previously rendered molten by heating means associated with the kettle. This process, is however, slow and messy and requires excessive handling of the lens blank by parts of the machine required to transfer the lens blank from sighting position to another section of the machine for securement to the lens block. This extra movement introduces an additional disadvantageous factor in that there is a possibility that the lens blank may be accidentally shifted from its position as initially located during the transfer to the lens block and thus be consequently inaccurately finished.

The present invention improves upon prior art device by providing a removable table for locating the lens blank adjacent the sighting means, the table being provided with improved means for positioning the lens blank with respect to the amount of prism to be provided, and providing means for positioning a heating element between the lens blank and the lens block to which the blank is to be secured to simultaneously heat the blank and the block, for fixedly securing the lens blank to the lens block, the block having previously had an adhesive in the nature of a solid secured thereto by means of a furnace which is adapted to simultaneously secure a plurality of adhesive pellets to a corresponding number of lens blocks, the furnace having means for projecting radiant heat onto the blocks and pellets for a predetermined length of time in accordance with the setting of a timing device associated with the device. With this construction there is also provided means for raising the lens blank vertically from the table and lowering the blank into contacting position with the lens block, the entire line of movement of the lens blank being always in a direction perpendicular to the surface of the lens blank supporting table.

This eliminates excessive movement of the lens blank after being positioned by the sighting device, and also eliminates the use of a kettle carrying a liquid adhesive, together with the accessories necessary for confining the liquid adhesive to the desired surfaces to be adhered, consequently resulting in an accurate positioning of the lens blank upon the lens block in a neat and efficient manner.

A further improvement resides in the provision of an electronic timing device for controlling the length of time the heating element is operated to heat the adjacent surfaces of the lens blank and the block carrying the previously affixed adhesive. This timing control prevents the possibility of overheating which may have the disasterous consequences of craking the lens blank or burning the adhesive, or if the heating cycle is too short the lens blank may not be securely attached to the block.

Referring more particularly to the drawings wherein like characters of reference designate like parts throughout the several views, the device embodying the invention comprises a hollow base 1 having spaced parallel transverse supports 2 and 3 thereon. Extending upwardly adjacent the rear ends of the supports 2 and 3 is a hollow upright 4 (Fig. 2) having a web 5 in the upper portion thereof adapted to carry a forwardly and upwardly extending supporting bracket 6, the bracket being fixedly secured to the web 5 by means such as screws or bolts 7.

Located in spanning relation to the forward portions of the spaced supports 2 and 3 is a movable table 8 provided on the underside thereof with a plurality of removable metal pads 9, (Figs. 2 and 6), each of which pads is adapted to make end to end contact with a corresponding aligned removable metal pad 10, the pads 10 being located in the upper surfaces of the supports 2 and 3 and in the upper surface of a protruding portion 11 of the front wall of the upright 4. The adjoining surfaces of the pads 9 and 10 are machined so that the upper surface of the table 8 will be located in a perfectly horizontal plane, it being possible to adjust this plane by grinding the ends of one or more of the pads 9 and 10. Locking pins 12 are fixedly located in the upper surfaces of the supports 2 and 3 and are adapted to removably engage bushings 13 located in the under side of the table 8, and serve to hold the table stationary. The table 8, supports 2 and 3, and upright portion 11 are provided with vertical openings 14 concentric with the inner ends of pads 9 and 10 and bushings 13 so that they may be easily knocked out for repair or replacement if desired.

Figure 3:
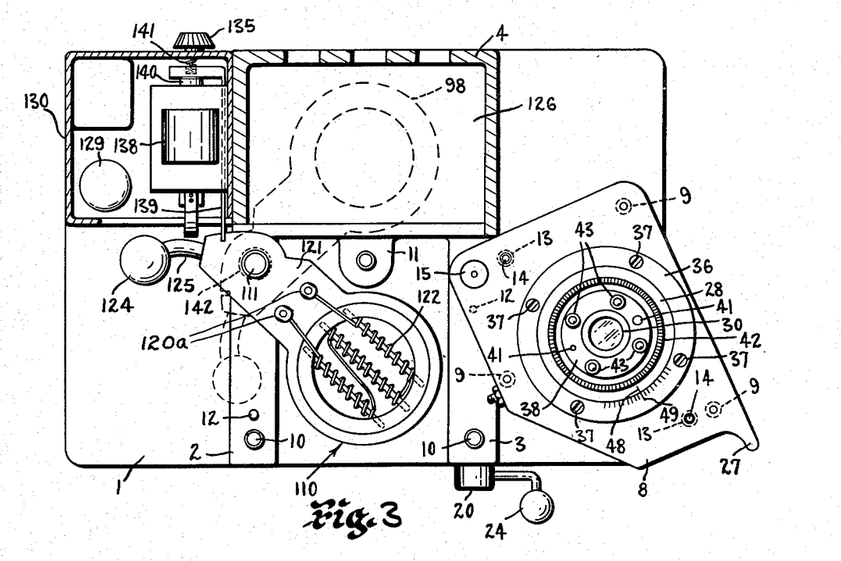
Fig. 3 is a plan view of said device partly in section with the sighting means removed to show the heating element and associated parts.

Manually operative means is provided for moving the table 8 and includes a vertical shaft 15 (Fig. 6) rotatably mounted throughout the major portion of its length in a fixed bushing 17 in the support 3 and having its upper end fixedly secured near the right rear corner of the table 8 and held in said fixed position by a set screw 16 or the like. Spaced bushings 18 are fixedly located in the front and rear ends of the support 3 and serve to rotatably support a transverse shaft 19, the forward end of which carries a hub 20 secured thereon by a pin 21, the rear end of shaft 19 having a washer 22 secured thereon by a pin 23 for retaining the shaft 19 in position. A handle 24 is secured to the hub 20 and serves to rotate the shaft 19, the shaft 19 being provided adjacent the point of contact by the lower end of the vertical shaft 15 with a cam portion 25, the cam portion being adapted to raise the shaft 15 when the handle 24 is operated to rotate shaft 19, and subsequently will lift the table 8 off the pins 12 as indicated in dotted outline in Fig. 6, permitting the table to be swung to one side about the axis of the shaft 15 to a position as shown in Fig. 3. The vertical shaft 15 is provided with a longitudinal bore 26 to permit the cam portion 25 of the shaft 19 to be lubricated, thus assuring easy operation of the device, and the table 8 is provided at the corner diagonally across from the shaft 15 with a short extension or handle portion 27 to be grasped by the operator for ease in moving the table.

The table 8 has rotatably mounted on the upper surface thereof a disc member 28 having a centrally located vertical opening 29 in which is fixedly secured a translucent member 30, the opening 29 being in vertical alignment with concentric openings 31 and 32 in the table 8 and base 1 respectively. Thus, light emanating from a source such as bulb 33 suitably located in the base 1 as by a socket 34 and bracket 35 can be seen through the translucent light diffusing member 30. (Fig. 2), the light being energized by any suitable source of current.

Figures 2, 8, 9, 10, 11:
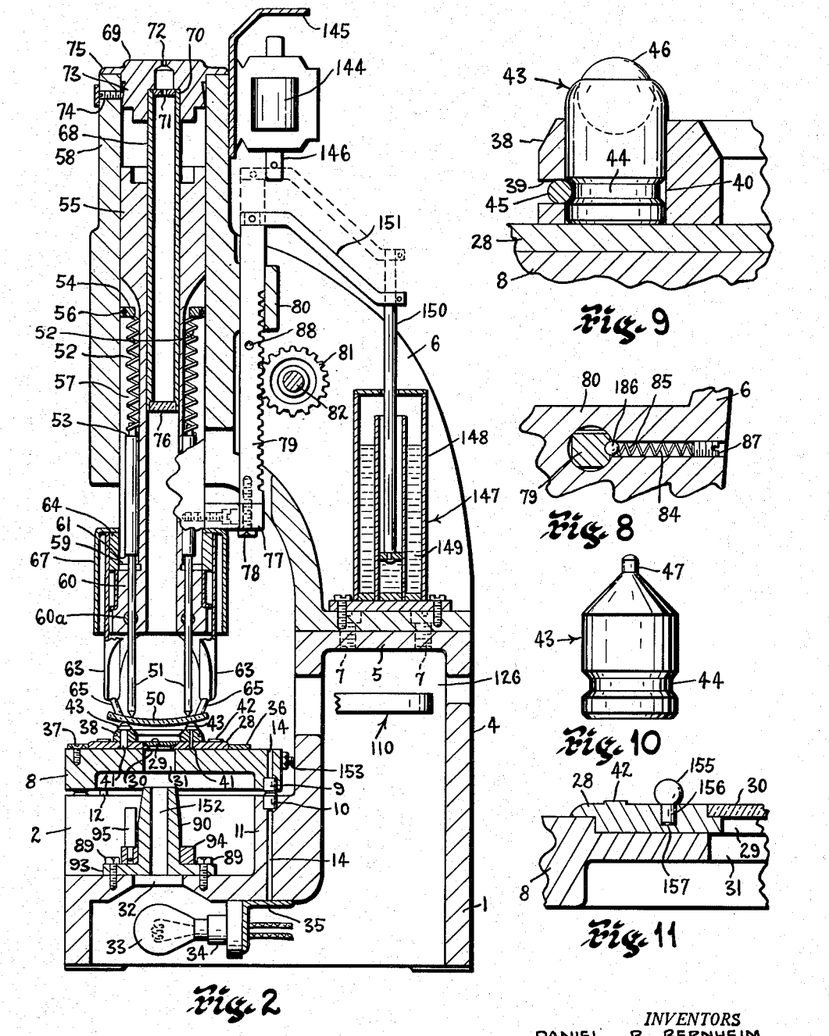
Fig. 2 is a longitudinal sectional view taken on line 2—2 of Fig. 1 showing the sighting and gripping means for aligning a lens blank.
Fig. 8 is a sectional view taken through a portion of the supporting bracket and illustrating particularly the spring detent mechanism for retaining the sighting device in raised position.
Fig. 9 is a sectional view showing the means for locating the lens supporting pins in the prism adjusting device.
Fig. 10 is a front elevation illustrating a modified type of lens supporting pin.
Fig. 11 is a fragmentary sectional view showing a modified form of prism adjustment means.

A retaining ring 36 is secured to the upper surface of the table 8 by means such as screws 37, the disc 28 being of such diameter as to snugly reside within the opening in the ring 36 and rotate therein. Fixedly secured to the upper surface of the disc 28 is a beveled ring member 38 having a groove or channel 39 (Fig. 9) formed in the periphery thereof, the member 38 being removably mounted on the disc 28 by means of pins 41, the pins 41 being fixedly mounted in the disc 28 and adapted to comate with vertical openings in the under side of the member 38. Thus the member 38 may be lifted off the pins 41 and disc 28 but in normal operation is adapted to reside against the surface of the disc 28 and to be rotated therewith. The upper surface of the disc 28 is provided with a knurled portion 42 whereby the disc 28 and member 38 may be easily rotated. The member 38 is provided with vertical openings 40 (Fig. 9) which are located adjacent the outer edge of the member 38 in such a manner that the channel 39 cuts into the side walls of the openings 40 to provide a passageway into said openings. Prism regulating pins 43 of varying lengths are adapted to be inserted into the openings 40. The pins are provided with a circumferential groove 44 in which a circular spring clip or ring 45, positioned in the channel 39, is adapted to removably retain the pins in the openings. Thus, the pins 43 may be lifted upwardly against the tension exerted by the clip or ring 45 to be replaced or the like, with the replacement pin inserted into the opening 40 and forced downwardly against the pressure exerted by the clip or ring 45 to become firmly seated in a manner as shown in Fig. 9. The upper end of each pin 43 is provided with a ball bearing tip 46, or may have a conical shape having a short extension 47 at the apex as shown in Fig. 10, a lens blank 50 to be blocked being adapted to be rested upon the portions 46 or 47 of the pins 43.

The disc 28 is provided with a plurality of location lines 48 which cooperatively function with a degree scale 49 marked on the retaining ring 36. The amount of the prism which is to be introduced in the lens blank 50, which lens blank is being supported by the ends of the pins 43, is determined by positioning pins 43 of the desired controlled lengths in the openings 40 in the member 38. By inserting pins of varying lengths it will be seen that the lens blank 50 will repose at varying angles, and by this means various amounts of prism may be introduced in the lens. The location lines 48 and degree scale 49 are for the purpose of locating the blank in the proper meridian according to the cylinder axis or prism axis desired in the finished lens. The center and the axis lines are previously marked on the lens blank following the usual procedure in the manufacture of ophthalmic lenses, and are used to accurately position the lens blank in the present device. In this manner the axis of the prism and cylinder may be positively located and the extent of prism may be introduced as well as accurate centering.

Figure 1:
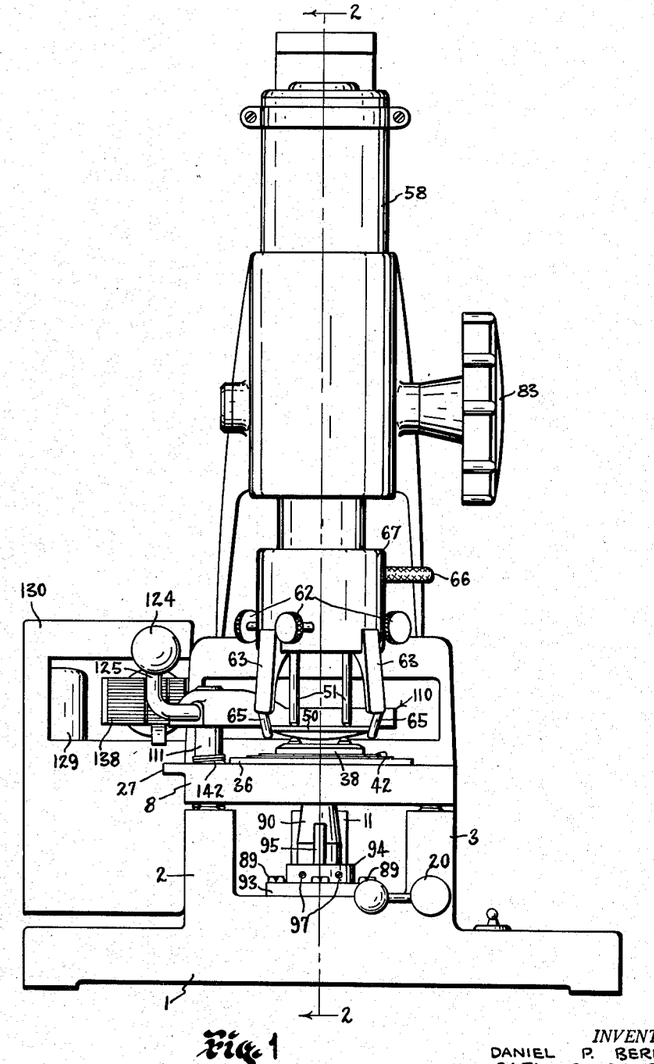
Fig. 1 is a front elevational view of a device embodying the invention.

After the lens blank has been positioned, as stated above, a plurality of contact members 51 are moved directly into engagement with the upper surface of the lens blank 50. The contact members 51, as shown in Fig. 2, are independently urged toward the lens blank 50 by means of backing springs 52 which engage each of the contact members 51 at one end thereof, as indicated at 53, and at the opposite ends engage a split washer 54. The washer 54 is formed of two semi-circular shaped members which are adapted to be located in a circumferential groove in the sighting device body member 55 by means of a spring clip or wire 56, the upper ends of the backing springs 52 being adapted to engage the lower surface of the washer 54. The body member 55 of the sighting device is vertically movable internally of a housing 58 carried by the supporting bracket 6 and is provided with a plurality of longitudinal grooves 57, as shown in Fig. 2. The contact members 51 and backing springs 52 are positioned within these grooves 57 with sufficient clearance so that the body member 55 and attached parts are free to reciprocate as a unit in the housing 58. The longitudinal grooves 57 terminate at their lower ends in shouldered edges 59 and communicate with a plurality of openings 60 in which the reduced portions of the contact members 51 are slidably mounted. The members 51 are each provided with a shouldered portion 61 which is adapted to engage the shouldered edge 59 of the grooves 57 and limit the downward movement of said members 51 under the reaction of the backing springs 52. The lower end of the body member 55 is provided with a plurality of transversely extending openings 60a directly intercepting the openings 60 in which the reduced portions of the contact members 51 are slidably mounted. Each of said latter openings is adapted to receive the shank of a knurled clamp screw 62 (Fig. 1) the ends of the shank being adapted to directly or indirectly engage the contact members 51 when the clamp screws 62 are operated by any suitable method which may be used for locking the contact members 51 against longitudinal movement in the openings 60.

The clamp screws 62 are also indirectly connected by means not shown with a plurality of downwardly extending spring fingers 63, which fingers are rigidly attached adjacent their upper ends to a ring member 64 pressed or otherwise fixedly secured about the body member 55 near the lower end thereof and have their lower ends provided with means such as heat resistant rubber tubing or other suitable means forming cushion grips 65 for engaging the edge of and for gripping the lens blank 50. The clamp screws 62 and spring fingers 63 are constructed and function in the same manner as shown in Patent No. 2,253,954 issued August 26, 1941 to Lloyd W. Goddu. It is believed sufficient to state that in the present invention a manually operable handle 66 (Fig. 1) protrudes from the casing 67 and is adapted to be moved transversely in a slotted opening in the casing 67 to rotate a cam mechanism, which cam mechanism controls the inward and outward oscillating movement of the spring fingers 63. When the clamp screws 62 are loosened the handle 66 may be moved within the confines of the slotted opening whereby the grips 65 of the spring fingers 63 are permitted to engage the edge of the lens blank 50, gripping the said blank through the inherent resiliency of the fingers, and are held in gripping relation with the edge of the blank by tightening the clamp screws 62, which tightening operation simultaneously locks the contact members 51 against longitudinal movement in the openings 60.

The body member 55 is provided, as shown in Fig. 2, with a hollow bore in which is extended a sighting tube 68. This tube is secured to a cap member 69 and has a washer 70 located adjacent the upper end thereof, the washer being provided with a restricted opening 71 centrally thereof. The cap member 69 is similarly provided with a restricted opening 72 in axial alignment with the opening 71 and has a tapered portion 73 internally of the housing 53, the taper of the portion 73 being such that tightening of the screws 74 automatically cams the cap member 69 in a direction inwardly of the housing 53 and forces the flange portion 75 of said cap member 69 into binding relation with the upper edge surface of the housing 53. The lower end of the sighting tube 68 is provided with a transparent member 76 in the form of a disc having cross-hairs (not shown) thereon. The cross-hairs may be adjusted to an initial meridional position by loosening the binding screws 74 and rotating the cap member 69 and the point of intersection thereof is coaxial with the tube and provides means with which a marked center on the blank may be aligned by sighting through the openings 71 and 72. This accurately centers the lens blank.

The assemblage including the body member 55, contact members 51, spring fingers 63, and their cooperative parts, is slidably supported in the housing 53 and is constantly urged by gravity toward the lens supporting table 8. A rack supporting lug 77 is bolted or otherwise secured to the body member 55 at a point well below the lower end of the housing 53 and has connected thereto by screws 78 the lower end of a vertically extending toothed rack 79, the rack being slidably disposed through an opening in a boss 80 formed integral with the rear of the housing 53. A pinion gear 81 adapted to mesh with the rack 79 is fixedly secured to a shaft 82, the shaft being rotatably mounted in the bracket 6 and having an operating knob 83 (Fig. 1) secured to one end thereof. Thus, manual rotation of the knob 83 will cause vertical movement of the body member 55 and consequently of the contact members 51 and spring fingers 63, toward or away from the lens blank 50.

Means may be provided for holding the sighting device in its raised position. Such a device is illustrated in Fig. 8 and includes a coil spring 84 which is located in a transverse bore 85 in the supporting bracket 6 and is adapted to urge a ball member 86 positioned adjacent its outer end toward the rack 79. The bore 85 is threaded near its outer end for reception of a threaded stud 87, which stud serves to retain the spring within the bore 85. A small cavity or indentation 88 (Fig. 2) is formed in the side wall of the rack 79 where it may be engaged by the ball member 86 of the spring detent when the sighting device is in its raised position. When the ball member 86 engages the cavity 88 the action of the coil spring 84 will maintain the sighting device in its raised position. The sighting device may, however, be lowered by rotating the knob 83 to overcome the force exerted by the spring 84.

In using this portion of the subject invention, the handle 66 is initially moved to spread the spring fingers 63 outwardly. The knob 83 is then manually rotated to lower the sleeve 57, and the contact members 51 are guided into engagement with the upper surface of the lens blank 50 positioned on the pin members 46. The said blank has been previously aligned as to center, its prism and cylinder axes, and the extent of prism, and during the locating of the contact members 51 said blank is preferably manually supported in desired aligned position on the pin members 43. The spring fingers 63 are now operated so that they will grip the contour edge of the lens blank 50. This is accomplished by moving the handle 66 to permit the spring fingers to resiliently engage the edge of the lens blank with the contact members 51 engaging the upper surface of the blank. A check is then made by sighting through the sighting tube 68 to insure that the lens blank has not moved from its desired prelocated position. The clamp screws 62 are then tightened to simultaneously secure the spring fingers 63 in gripping relation with the edge of the lens blank 50 and to secure the contact members 51 against longitudinal movement. It is to be noted that the gripping ends 65 of the fingers 63 are angled inwardly so as to insure a positive grip with the edge of the lens blank. After positively locating the spring fingers 63 and contact members 51 by tightening the clamp screws 62 the knob 83 may be again rotated to raise the body member 55 and consequently lift the lens blank 50 off the pins 46.

After removing the lens 50 from the pin members 46 the machine operator will rotate the handle 24 to raise the table 8, as hereinbefore described, and by grasping the short extension 27 will swing the table on the axis of the vertical shaft 15 to a sidewise position substantially as shown in Fig. 3.

Figure 7:
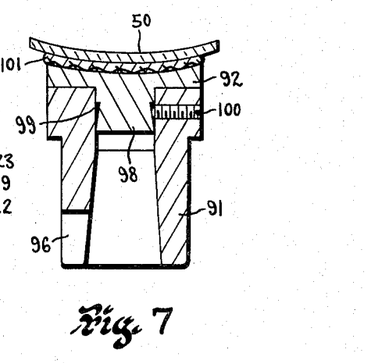
Fig. 7 is a sectional view showing details of the construction of the lens block with a lens blank attached thereto.

Located by bolts 89 on the base 1 in axial alignment with the sighting device is an upright which has a tapering support 90 thereon on which is fitted an adapter 91 holding a lens block 92. The upright is formed with a base portion 93 on which resides a ring member 94 which is adapted to rotate about the tapered support 90. A vertical locating pin 95 is fixedly positioned in the upper surface of the ring member 94 and is adapted to engage a slot 96 in the adapter 91. Thus by rotating the ring member 94 and pin 95 the adapter 91 may be located as desired, set screws 97 being provided to lock the ring member 94 in adjusted position. The adapter 91 has a recessed upper end (Fig. 7) in which is extended a shank 98 on the under side of the block 92, the shank 98 having a circumferential taper 99 which is adapted to be engaged by a plurality of set screws 100. The tapered portion 99 is such that the binding action of the set screws 100 moves the block 92 in a direction inwardly of the recess. The adapter 91 also has a tapered recess in its lower surface whereby it may be easily positioned on the tapered portion 90 of the upright in axial alignment with the disc member 28 and sighting device. It is to be understood that the upright may be permanently attached to the machine and is provided with a central opening axially aligned with the sighting tube 68 and openings 32 and 31 in the base 1 and table 8 respectively, the adapter 91 to be attached after removal of the table 8 from position directly above the upright.

Figure 12:
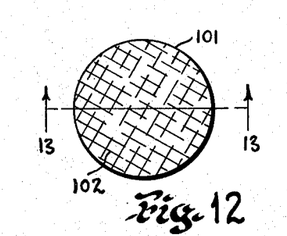
Fig. 12 is a bottom plan view of a pitch pellet used as the adhesive for securing a lens blank to a lens block.
Figure 13:
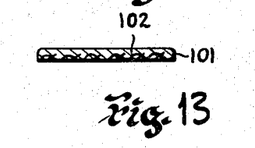
Fig. 13 is a sectional view of the pitch pellet taken on line 13—13 of Fig. 12.

The lens block 92 carries an adhesive which has been previously affixed thereto, the adhesive being preferably in the form of a solid pellet 101 (Figs. 12 and 13) of pitch or the like, and is used for securing the lens blank to the lens block. The pellet 101 may be made of any of the commonly known heat-effective adhesive compositions used for this purpose and is preferably of a substantial disc shape, the composition being molded or otherwise made into solid form with a backing 102 of crinoline or other suitable coarse, foraminous reinforcing material pressed into the pellet during the initial fabrication thereof and while the pellet is in a soft or pliable condition. Since pellets of this type are thin and may become broken during initial handling or when placed on the lens holder or block the backing provides means for retaining the broken pieces together and also serves to retard sidewise flow of the adhesive under the action of heat. Also, the fabric backing 102 will enable the lens blank to be much more easily removed eventually from a lens block.

Figure 14:
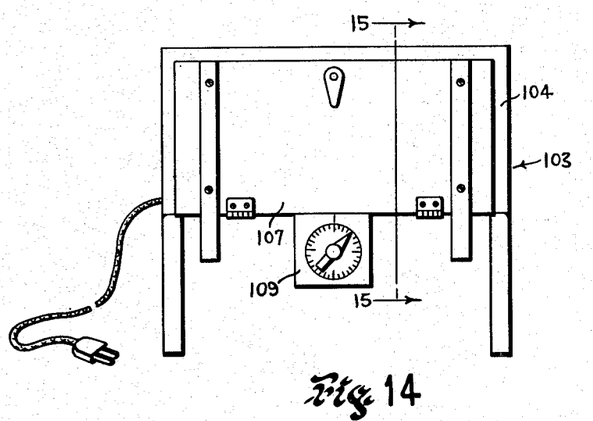
Fig. 14 is a front elevation of the furnace used for the preliminary attachment of the adhesive pellets to the lens blocks.
Figure 15:
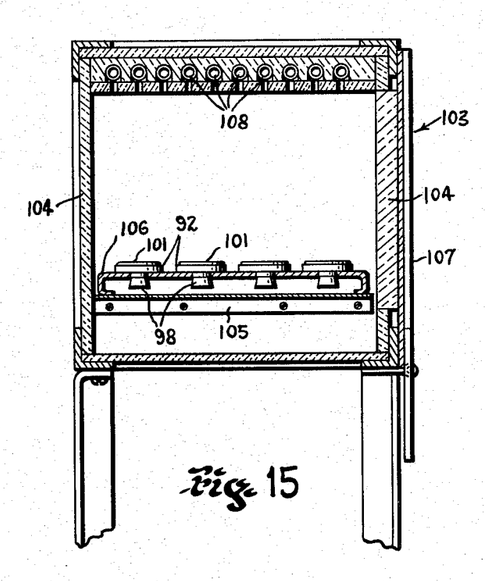
Fig. 15 is an enlarged sectional view taken on line 15—15 of Fig. 14.

In applying the adhesive pellet 101 to a lens block means such as a furnace 103 (Figs. 14 and 15) is employed, which furnace may be of any suitable type embodying a housing 104 having walls made of suitable heat resistant material and having a shelf 105 located therein. A tray 106 having a plurality of openings therein is adapted to carry a supply of lens blocks 92, each block having an adhesive pellet 101 disposed on its upper surface. The tray 106 carrying the supply of blocks 92 and pellets 101 is adapted to be placed inside the housing 104 on the shelf 105, a door 107 being suitably hinged to the housing to provide easy access into the interior thereof. A source of heat such as coils 108 are located within the housing 104 and are adapted, when energized, to radiate heat onto the surfaces of the lens blocks 92 on the tray 106 and cause the pellets carried by the blocks 92 to become at least partially molten. After heating, the blocks and pellets are permitted to cool to secure the pellets firmly to the blocks whereupon the blocks may be removed from the tray 106 and used in blocking devices.

Since it is possible to burn the adhesive and thereby render the pellets useless for present purposes it is desirable to provide means for automatically timing the heating cycle and thereby permit the pellets to be satisfactorily attached to the blocks. This is accomplished through the use of an electrical timing device 109 provided adjacent the furnace 103 and in the electrical circuit to the heating elements 108. After inserting the tray 106 carrying the supply of blocks 92 and pellets 101 in the furnace the electrical circuit to the coils 108 will be energized and the timing device 109 will then operate to break the circuit to the coils after a predetermined length of time has elapsed. This provides a simple, fast and efficient method of applying adhesive pellets to lens blocks in substantially large quantities.

After the table 8 has been removed from position over the supports 2 and 3 as described an adapter 91 carrying a block 92 with an adhesive pellet 101 securely affixed thereto is placed on the tapered portion 90 of the upright and means is then employed for securing the lens 50 to the block 92. Such means includes a heating element 110 which is rotatably mounted for insertion between the lens 50 and the block 92.

A vertical opening in the rear portion of the support 2 carries a shaft 111 (Fig. 4) which carries the heating element 110 adjacent its upper end, the opening being of such size as to rotatably receive the shaft 111 and having an aligned opening of smaller diameter extending from the lower end thereof adapted to receive an extension 112 on the lower end of the shaft 111. The extension 112 of the shaft 111 has secured thereto by a pin or other suitable means a collar 113 carrying a pair of eccentrically located studs 114 and 115, the studs 114 and 115 being adapted to engage leaf springs 116 and 117 which are connected to and act as the respective actuating members of a pair of micro-switches 118 and 119, which switches are secured to the base 1 by means such as screws 120, and are adapted to be contacted by the studs 114 and 115 to open and close the switches 118 and 119 upon rotation of the shaft 111.

Terminals 120a are provided in the non-conductive bracket portion 121 of the heating element 110 (Fig. 3) and have the coils 122 of the heating element connected thereto. The heating element is also connected by suitable wiring 123 into the circuit illustrated in Fig. 16.

Figure 4:
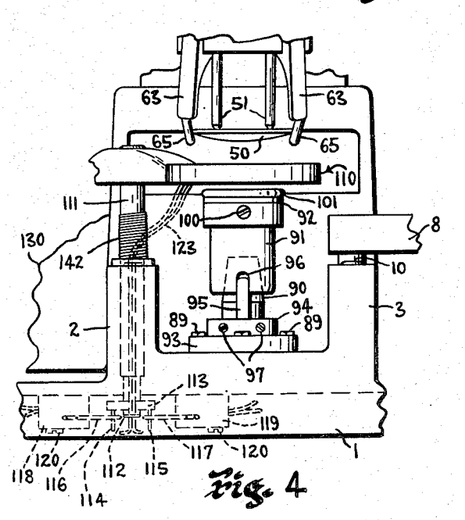
Fig. 4 is an enlarged fragmentary front elevational view showing the heating element in position for heating the lens blank and the lens block.
Figure 5:
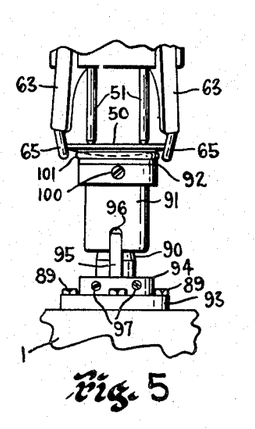
Fig. 5 is an enlarged fragmentary front elevational view showing the method of securing the lens blank to the lens block.

A knob 124 carried by a handle 125 is adapted to be grasped by the operator to rotate the heating element 110 from its normal unheated position within a cavity or depression 126 formed in the upright 4, as shown by dotted outline in Fig. 3, to the position shown by solid lines in the same illustration, whereby the heating element will be disposed between the lens blank 50 and the lens block 92 as shown in Fig. 4. This rotation of the heating element 110 and consequently of the shaft 111 will cause the pin 114 to engage the leaf spring 116 to operate the micro-switch 118 which energizes the coils 112 in the heating element 110.

Referring to the wiring diagram (Fig. 16), the stand-by condition of the circuit, with the main switch 127 closed, permits current to pass from the source of current SC through lead $a$ to the filament 128 of a dual purpose rectifier-amplifier thermionic vacuum tube 129 which, with many of the other electrical parts, may be located within a box 130 suitably secured to one side of the upright 4. Before the micro-switch 118 is operated upon rotation of the heating element the switch 118 is in position to close the circuit $a$—$b$—$c$ to the tube rectifier filament 131 which will pass current to the plate 132 and thence via lead $d$ to the condenser 133 which will store energy; the circuit being completed through lead e to the source of current SC.

Figure 16:
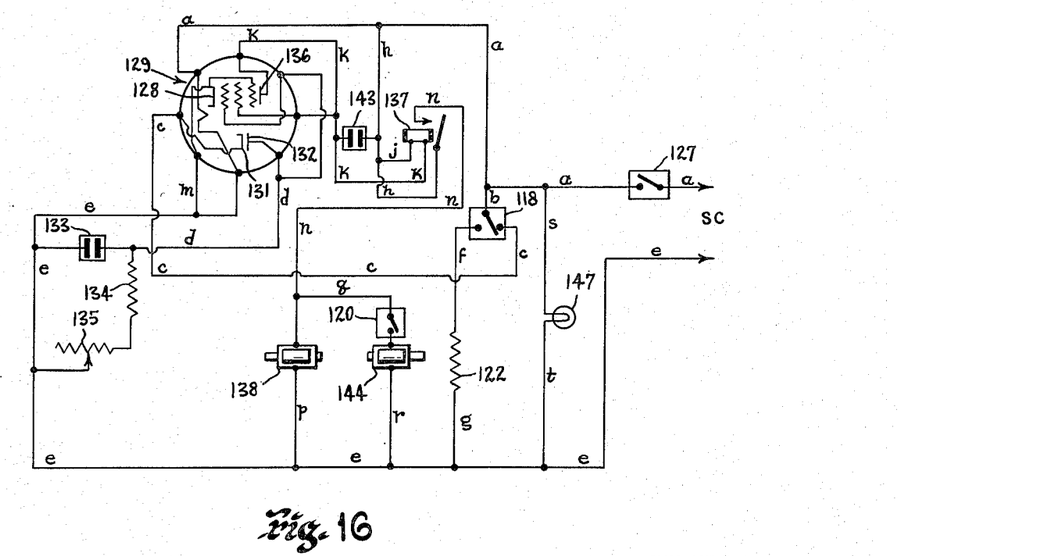
Fig. 16 is a schematic wiring diagram of the electronic control for the heating mechanism.

When the heating element is swung out and micro-switch 118 operated, this will energize the heater coils 122 through circuit a—b—f—g—e. This will simultaneously break the circuit to the rectifier filament 131, preventing current from passing to the condenser 133, whereupon the charge on condenser 133 will commence to drain off through resistors 134 and 135. Heretofore, the filament 128 of the tube has not been permitted to pass current since it is biased by the charge on the condenser 133. However, after a predetermined length of time, which time has been computed so as to permit the coils 122 to heat the adjacent surface of the lens blank 50 and the pellet 101, the condenser charge will reach a point low enough to allow enough current to pass from the filament 128 to the plate 136 to energize the relay 137, circuit a—h—j—k—m—e. Relay 137 upon being energized will close to complete the circuit to a latching solenoid 138, circuit a—h—n—p—e.

When the heating element 110 is initially moved into operative position a latch 139 is adapted to engage a notch formed in the rear of the non-conductive bracket portion 121 of the heating element 110, the latch 139 being secured to the armature 140 of the solenoid 138 and constantly urged toward the heating element 110 by a coil spring 141. When the solenoid 138 is energized by the closing of relay 137, however, it will cause the latch 139 to be drawn rearwardly by the armature 140 against the tension of the spring 141, and the heating element 110 will then be free to return to its inoperative position in the space 126 within the upright 4. The return movement of the heating element 110 is under the influence of a coiled tension spring 142 which is located over the rotatable shaft 142 and is suitably connected thereto in such a manner that upon release of the latch 139 the spring 142 will immediately return the heating element to the position indicated in dotted outline in Fig. 3.

When the heating element returns to its inoperative position the rotation of the shaft 111 will return the microswitch 118 to its normal initial condition, thus breaking the circuit to the heater coils 122 and restoring the bias voltage through the filament 131 and plate 132 of the tube 129. With the bias voltage thus restored the passage of current to plate 136 is interrupted. Relay 137, which would ordinarily open immediately, is then momentarily prevented from opening by the charge on a condenser 143, which condenser stored energy when the relay was energized. However, when the condenser 143 has been drained sufficiently the relay 137 will open. This slight delay is sufficient to permit the heating element 110 to return to its position within the upright 4 whereupon the shaft 111 will be rotated sufficiently to cause pin 115 to engage the leaf spring 117, thus closing micro-switch 120, allowing current to pass to a dropping solenoid 144, circuit a-h-n-q-r-e.

The dropping solenoid 144 is located on a bracket 145 secured to the top of the sighting device housing 58 (Fig. 2) adjacent the upper end of the rack 79. When the solenoid 144 is thus energized, the armature 146 therein will be quickly moved downwardly and will forcefully engage the end of the rack 79 and overcome the force exerted by the spring detent device (Fig. 8) and the sighting device carrying the lens blank 50 will drop downwardly to bring the heated lower surface of the lens blank 50 into pressing intimate engagement with the heat softened adhesive pellet 101.

It is to be understood, therefore, that the opening of relay 137 must be delayed for a time sufficient to permit the heating element to retract and cause energization of solenoid 144. Then upon the draining of the condenser 143 and consequent opening of relay 137, this will break the circuits to both solenoids 138 and 144 and thus return the entire circuit to its normal standby condition.

The timing cycle for the heating operation can be varied by manual adjustment of the variable resistance 135 to control the drain on condenser 133. The lamp 33 is also included in the circuit and arranged so that it will be illuminated when the main switch 127 is closed, circuit a-s-t-e.

A lens blank 50 when in lowered position is constantly urged toward the pitch pellet 101 as described hereinbefore so that shrinkage due to the cooling of the pellet is compensated for. When the pellet has cooled sufficiently to secure the lens blank 50 to the block 92, the clamp screws 62 are loosened, whereupon the spring fingers 63 may be moved outwardly through manual operation of the handle 66. The fingers 63 and contact members 51, body member 55, and associated mechanism are then lifted in the housing 58 by manual operation of knob 83, and the adapter 91 together with the lens block 92 having the lens blank 50 secured thereto may be lifted off the upright 90.

When the sighting device carrying the lens 50 is caused to drop to locate the lens blank upon the block 92, the dropping movement is under the control of a suitable motion dampening device such as the dashpot 147 (Fig. 2) which constitues a cylinder 148 located upon the web 5 of the upright 4 and filled with a liquid 149 of the desired viscosity and having a plunger 150 connected by a connecting member 151 to the rack 79 and adapted to move therewith. Thus the speed at which the lens blank 50 is brought into engagement with the pellet 101 is controlled and possible breakage prevented.

The upright 90 for supporting the lens block adapter 87 is provided with a vertical opening 152 (Fig. 2) axially aligned with the base opening 32 and table opening 31 to permit illumination from lamp 33 to pass upwardly through the translucent light diffusing member 30 and to illuminate the lens blank 50. The lamp 33 is controlled by the switch 127 and may be positioned slightly out of alignment with the opening 32 and the member 30 for the purpose of providing indirect diffused light or may be directly in alignment therewith in order to provide the greatest illumination on the lens blank 50. If desired, suitable means may be provided for moving the lamp 33 into and out of alignment.

Figure 6:
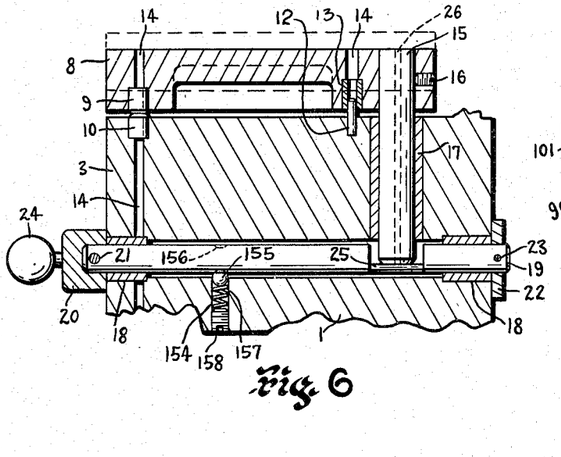
Fig. 6 is a fragmentary sectional view taken on line 6—6 of Fig. 1 showing the means for controlling the position of the lens blank supporting table.

It is to be understood that the movable lens supporting table 8 may be provided with simple adjustable means for aligning the bushings 13 in the under side thereof with the pins 12 when returning the table 8 to its position in spanning relation to the supports 2 and 3 after a lens has been blocked and removed from the adapter 91, whereby the table 8 may be more quickly and easily positioned in axial alignment with the holding device for successive lens aligning operations. This may be accomplished by providing means such as the adjustable stop member 153 (Fig. 2) located in the rear edge of the table member 8 and adjustably positioned so that when the table 8 is swung to a position spanning the supports 2 and 3 it will abut the front surface of the upright 4 to position the table for proper disposition thereof upon the locking pins 12 without unnecessary "feeling" or "groping." Also, if desired, the mechanism for raising and lowering the lens supporting table 8 may be provided with a spring detent device for restraining the table from undesired vertical movement. Such a detent similar to the spring detent of the sighting device is illustrated in Fig. 6 wherein a coil spring 154 and ball member 155 cooperate with cavities or indentations 156 in the transverse shaft 19, the spring and ball being positioned in a vertical bore 157 in the base 1 and retained therein by a stud 158. Thus the shaft 19 may be rotated to raise or lower the table 8 and the detent will operate to maintain the table in either its uppermost or lower position until enough manual force is applied to the handle 24 to overcome the action of the spring 154 and thus permit the table to be moved vertically.

It will be noted by reference to Fig. 11 that the introduction of prism in a lens blank may be accomplished by using ball members 155 provided with integral pin extensions 156 of varying lengths, the extensions adapted to reside in vertical openings 157 formed in the upper surface of the disc member 28. The amounts of prism to be introduced in a lens blank can be easily varied by employing ball members 155 with extensions 156 of lengths controlled according to the prism desired. Additional openings (not shown) may be provided in the surface of the disc member 28 in which the ball members may be located if desired, the openings being spaced radially of and equidistant from the axis of the disc member 28. The purpose of providing such additional openings is to enable the blocking of lenses which do not have a continuous surface thereon, such as, for example, bifocals wherein the segment portion of the bifocal is of a different curvature than the adjacent surface of the blank. By placing the ball members 155 in the proper openings all of said members may be made to engage the surface of the blank adjacent to and at a location clear of the segment portion.

It is also to be understood that the table 8 may be provided with a base portion having a tapered bore adapted to fit over the tapered upright 86 for positional purposes and may be used either with or without the contact members 9 and 10.

From the foregoing description it will be seen that an invention of the character described is very definitely an improvement over the prior art by providing a machine with improved means for sighting and gripping semi-finished lens blanks for introducing desired optical characteristics which the finished lens is to possess, and the lens blank held by the improved gripping means in such a manner as to retain its position with respect to the prescriptive characteristics; also by providing means for preliminarily attaching a quantity of adhesive pellets to an equal number of blocks before the lens blocking operation; and also by providing neat and efficient means for securing a lens blank to a lens block by including a heating element movable under automatic electronic control and adapted to heat the adjacent surfaces of the lens blank and the adhesive pellet to join the lens blank to the block in a very satisfactory manner, in contrast to the messy means employed by prior art devices which are generally of a somewhat involved nature and which employ a pot carrying a molten adhesive and accessories necessary to confine the pitch to certain areas of the lens block to which the lens blank is to be attached. The present invention also improves upon the prior art by providing means for raising and lowering the lens blank in a vertical line of movement prependicular to the surface of the table used for initially supporting the lens blank and by shortening the length of travel and confining the movement thereof during the blocking operation to said vertical line thereby eliminating to a great degree possible inaccuracies in blocking.

The advantages of our invention will be readily understood from the foregoing description and, while we have shown and described a preferred embodiment of our invention, it is evident that various modifications may be made that will come within the scope of the invention, and we do not desire, therefore, to limit ourselves to the exact form of construction shown and described herein.

Having described our invention, we claim:

1. In a device of the character described, the combination of a base, adjusting means on said base for supporting a lens blank in a predetermined position, a holding device supported on said base having gripping means adapted to contact and retain said lens blank in adjusted position, said holding device being movable with said gripping means and said lens blank in a direction toward or away from the adjusting means, retaining means on said base normally supporting said holding device in a position spaced from the adjusting means, lens block supporting means on said base having a lens block supported thereon in spaced axial alignment with said holding device, said lens block having a heat softenable adhesive substance fixedly secured to the surface thereof, a heating device rotatably mounted on said base and adapted to be moved into and out of operative position between the lens blank and the adhesive on the lens block and to heat the adjacent surfaces thereof, a switch positioned for operation by the heating element upon rotation thereof into operative position between the lens blank and adhesive, a timing device under control of said switch and means operable by said timing device for automatically returning the heating element to inoperative position from between the blank and adhesive upon completion of the timing cycle, and a second switch arrangement operable by the heating element upon rotation into said inoperative position from between the blank and adhesive and means energizable by said second switch for releasing said retaining means and moving the holding devise for the lens blank toward the lens block so that the lens blank will engage with the adhesive on the lens block while the lens blank is retained in adjusted position.

2. In a device of the character described, the combination of a base, adjusting means located on said base comprising a table member provided with a member carrying adjustable spaced contacts on which a lens blank is adapted to reside, said member being adjustable to locate the lens blank in accordance with its predetermined cylinder axis, said contacts being adjustable to provide angular displacement of the lens blank to introduce a predetermined amount of prism thereto, a holding device supported on said base in axial alignment with said adjusting means and movable in a direction perpendicular to the surface of said table member, said holding device having gripping means adapted to contact the peripheral edge of and retain said lens blank in adjusted position, said holding device being movable with said gripping means and said lens blank in a direction vertically toward or away from the adjusting means, lens block supporting means on said base in spaced axial alignment with said holding device and adapted to support a lens block having an adhesive affixed to the supporting surface thereof, a heating device mounted on said base and adapted to be moved into and out of operative position between the lens blank and the adhesive on the lens block to heat the adjacent surfaces thereof, means effecting the return of the heating element to inoperative position from between the blank and adhesive, latch means resisting said return effecting means to retain the heating element in operative position, control means operable by movement of the heating element into operative position for unlatching said latch means at the end of the heating cycle, and means operable by the heating element upon return to said inoperative position for effecting the engagement of the lens blank with the adhesive on the lens block to secure the lens blank to the lens block while the lens blank is retained in adjusted position.

3. In a device of the character described, the combination of a base having spaced supports thereon, adjusting means located on said supports comprising a table member rotatably mounted on said supports and normally positioned in spanning relation thereto, said table member having a rotatable disc member located thereon carrying a plurality of individually adjustable spaced contacts on which a lens blank is adapted to reside, said disc member being adjustable to locate the lens blank in accordance with its predetermined cylinder axis, said contacts being adjustable to provide angular displacement of the lens blank to introduce a predetermined amount of prism thereto, controlling mechanism for positioning said table member comprising a plurality of pin members located in said supports and adapted to comate with openings in said table member, and manually operable lifting means associated with said table to raise it from said pin members to permit the table to be moved, a holding device supported on said base in axial alignment with said adjusting means and movable in a direction perpendicular to the surface of said table member, said holding device having gripping means adapted to contact and retain said lens blank in adjusted position and being movable with said gripping means and said lens blank in a direction vertically toward or away from the adjusting means, lens block supporting means on said base in axial alignment with said holding device and adapted to support a lens block having an adhesive affixed to the supporting surface thereof, a heating device mounted on said base and adapted to be moved into operative position between the lens blank and the adhesive on the lens block and to heat the adjacent surfaces thereof, electronic means controlling the heating cycle and effecting the return of the heating element to inoperative position from between the blank and adhesive at the end of the heating cycle, and means operable by the heating element upon return to said inoperative position for effecting the engagement of the lens blank with the adhesive on the lens block to secure the lens blank to the lens block while the lens blank is retained in adjusted position.

4. A lens blocking device of the character described having adjusting means for locating a lens blank in a predetermined positional relation, a lens blank holder for releasably supporting the blank in said adjusted relation, a lens block holder for supporting a lens block with adhesive on a surface thereof in axial alignment with the lens blank holder, one of said holders being movable toward and away from the other holder, restraining means normally retaining said movable holder in spaced relation to the other holder against a force urging said holder to move toward the other holder, a heating member mounted for movement into and out of an operative position located between the holders for heating said adhesive on the surface of the lens block, and switch means operated by movement of the heating member out of said operative position and causing when so operated the resistance of the restraining means to be overcome whereby the lens blank and the adhesive on the surface of the lens block carried by the respective holder may be automatically brought together so that the lens blank will be secured to the lens block and while retained in its adjusted relation.

5. A lens blocking device of the character described having adjusting means for locating a lens blank in a predetermined positional relation, a lens blank holder for releasably supporting the blank in said adjusted relation, a lens block holder for supporting a lens block with a coating of adhesive on a surface thereof in axial alignment with the lens blank holder, one of said holders being movable toward and away from the other holder, latch means normally retaining said movable holder in spaced relation to the other holder against a force urging said holder to move toward the other holder, a heating member supported for movement into and out of an operative position between the holders for heating said adhesive coated surface of the lens block, switch means operated by movement of the heating member out of said operative position and causing when so operated the resistance of the latch means to be overcome whereby the lens blank and adhesively coated surface of the lens block carried by the respective holder may be automatically brought together so that the lens blank will be secured to the lens block and while retained in its adjusted relation, and cushioning means controlling the speed of movement of the movable holder toward the other holder.

6. A lens blocking device of the character described comprising a lens blank holder for releasably supporting the blank in a pre-adjusted positional relationship, a lens block holder for supporting a lens block with a coating of adhesive on a surface thereof in axial alignment with the lens blank holder, one of said holders being movable toward and away from the other holder, latch means normally retaining said movable holder in spaced relation to the other holder against a force urging said holder to move toward the other holder, a heating member supported for movement into and out of an operative position between the holders for heating said adhesive coated surface of the lens block, locking means holding the heating member in said operative position against a force urging it out of said operative position, control means operated by movement of the heating element into said operative position to unlock the locking means at the elapse of a predetermined time interval and switch means operated by movement of the heating member out of said operative position to cause the resistance of the latch means to be overcome whereby the lens blank and adhesively coated surface of the lens block carried by the respective holder may be automatically brought together so that the lens blank will be secured to the lens block and while retained in its adjusted relation.

7. In a lens blocking device of the character described embodying a lens blank holder for releasably supporting a lens blank in a pre-adjusted relation, a lens block holder for supporting a lens block with a coating of adhesive on a surface thereof in axial alignment with the lens blank holder, one of the holders being movable toward and away from the other holder, and a heating member supported for movement into and out of operative position between the holders for heating said adhesive coated surface of the lens block, control mechanism comprising a first latch normally retaining the movable holder at a position spaced from the other holder against a force urging it toward the other holder, a second latch normally retaining the heating member in said operative position between the two holders against a force urging said heating member to an inoperative position, a pair of solenoids operating said respective latches, said solenoids being located in respective circuits for connection of the solenoids to a source of electrical energy to energize the same, and a control switch in each of said circuits, one of said switches being operated by movement of the heating member to its operative position between the holders to permit energizing the solenoids actable upon the second latch when the adhesive coated surface of the lens block has been sufficiently heated by the heating member to automatically move the heating member out of said operative position between the holder and the other of said switches being operated by movement of the heating member to its inoperative position to energize the solenoid actable upon the first latch causing said latch to release the holder restrained thereby whereby the lens blank and adhesively coated surface of the lens block carried by the respective holders may be automatically brought together so that the lens blank will be secured to the lens block and while retained in its adjusted relation.

8. In a lens blocking device of the character described embodying a lens blank holder for releasably supporting a lens blank in a pre-adjusted relation, a lens block holder for supporting a lens block with a coating of adhesive on a surface thereof in axial alignment with the lens blank holder, one of the holders being movable toward and away from the other holder, and a heating member supported for movement into and out of operative position between the holders for heating said adhesive coated surface of the lens block, control mechanism comprising a first latch normally retaining the movable holder spaced from the other holder against a force urging it toward the other holder, a second latch retaining the heating member when positioned in said operative position between the two holders against a force urging said heating member out of said position, said latches being operated by a pair of solenoids, a pair of circuits for connecting said solenoids to a source of electrical energy to permit energizing of the same, and a circuit breaking switch in each of said circuits to permit energizing of the respective solenoids, one of said switches being operated by movement of the heating member to its operative position between the holders to energize the solenoid operable on the second latch when the adhesive coated surface of the lens block has been sufficiently heated by the heating member to automatically move the heating member out of said operative position between the holders and the other of said switches being operated by movement of the heating member to its inoperative position to energize the solenoid operable upon the first latch causing said latch to release the holder restrained thereby whereby the lens blank and adhesively coated surface of the lens block carried by the respective holders may be automatically brought together so that the lens blank will be secured to the lens block and while retained in its adjusted relation, together with regulating means for controlling the speed of movement of the movable holder.

9. In a device of the character described, the combination of a base having adjusting means for locating a lens blank in a predetermined positional relation, lens block supporting means located on said base for supporting a lens block with an upwardly disposed adhesively coated surface, a holding device supported on said base in overlying and axial alignment with said lens block supporting means and carrying gripping means adapted to contact and releasably retain a lens blank when in adjusted position, said holding device being movable in a direction vertically toward or away from the lens block supporting means, retaining means normally supporting said holding device in a position spaced from the lens block supporting means against the force of gravity urging the holding device toward the lens block supporting means, a heating device pivotally mounted on said base for movement into operative position between the holding device and supporting means so as to heat the adjacent surfaces of a lens blank and adhesively coated surface of a lens block when supported by the respective holding device and supporting means, and means actable upon said heating device for moving it out of said operative position, switch means operated by movement of the heating device out of said operative position, and said switch means when so operated acting upon further means causing said retaining means to cease its support of the holding device for the lens blank and permit it to fall under the action of gravity so that the lens blank will be moved into engagement with said adhesive-coated surface of the lens block while the lens is held in its adjusted position.

10. In a device of the character described, the combination of a base having supporting means for supporting a lens block with an outwardly disposed adhesively coated surface, a holding device for supporting a lens blank in axial alignment with the adhesively coated surface of said block, adjusting means located on said base intermediate the lens block supporting means and the holding device for the lens blank, said adjusting means including a table member carrying contacts on which the lens blank is adapted to adjustably reside in a predetermined position, the table member being mounted for movement into and out of alignment between the holding device and lens block supporting means, said holding device for the lens blank being movable toward or away from the lens block supporting means and having gripping means adapted to contact and releaseably retain said lens blank when in adjusted position, retaining means normally supporting said holding device in a position spaced from the lens block supporting means against a force urging the holding device toward the lens block supporting means, a heating device mounted on said base for movement into operative position between the holding device and supporting means to heat the adjacent surfaces of the lens blank and the adhesive on the lens block when supported by the respective supporting means and holding device, means acting upon said heating device for moving it out of said operative position at the completion of the heating cycle, switch means operated by said movement of the heating device out of operative position and said switch means when so operated acting on means causing said retaining means to cease its support of the holding device and permit said force to move the holding device to the lens block supporting means whereby the lens blank may be secured to the adhesively-coated surface of the lens block while retaining its adjusted position.

11. In a device of the character described, the combination of a base, supporting means located on said base for supporting a lens block having an exposed adhesive coated surface thereon, adjusting means on said base for adjusting a lens blank to a predetermined position relative to said block, and lens blank holding means supported on said base in axial alignment with said lens block supporting means and slidably mounted for movement in directions toward and away from the lens block supporting means, retaining means normally supporting said lens blank holding means in a position spaced from the lens block supporting means against a force urging it toward the lens block supporting means, a heating device mounted on said base for movement into operative position between the lens blank holding means and lens block supporting means to heat the adjacent surfaces of the lens blank and the adhesive coated surface of the lens block when supported by said respective means, switch means operated by movement of the heating device out of said operative position, and control means energized by the operation of said switch means causing said retaining means to cease its hold on the lens blank supporting means whereby the lens blank may be brought into engagement with the adhesive coated surface of the lens block while retaining its initial adjusted position, and cushioning means dampening the movement of said lens blank holding means toward the lens block supporting means.

12. In a device of the character described, the combination of a base, adjustment means located on said base for adjusting a lens blank to a predetermined position, a holding device supported on said base in axial alignment with said adjusting means and being moveable toward and away from said adjustment means, gripping means carried by said holding device to contact the peripheral edge of said lens blank and retain it when in adjusted position for movement with the holding device, lens block supporting means on said base, resilient retaining means carried by said base and normally frictionally engaging said holding device so as to retain it in a position spaced from the lens block supporting movement against a force normally urging the holding device in a direction toward the lens block supporting means, a heating device mounted on said base for movement into operative position between the holding device and lens block supporting means to heat the adjacent surfaces of the lens blank and an adhesive coated lens block when supported thereby, switch means operated by movement of the heating device to inoperative position, and means responsive to operation of the switch causing the said force acting on the holding device to overcome the frictional force of said retaining means and move the holding device and lens blank carried thereby into engagement with said adhesive coated lens block to permit the lens blank to be secured to the lens block while retaining its adjusted position.

13. In apparatus of the character described the combination of a lens block having a lens blank receiving surface, adhesive means disposed on said surface, heating means positioned for softening said adhesive to a condition where it will adhere to said surface of the lens block, a holding device supported in axial alignment with said surface of the lens block and for movement in directions toward and away from said surface of the lens block, adjustment means moveable into and out of position between the lens block and said holding device for supporting a lens blank for adjustment, said holding device having gripping means for releasably engaging said blank and supporting it during movement of the holding device toward and away from the lens block, retaining means frictionally engaging said holding device to restrain it against movement under the action of a force urging it toward the lens block, and a heating element supported for movement into operative position between the lens blank holding device and the adhesive means on the surface of the lens block to heat the adjacent surfaces of said lens blank when carried by the holding device and the adhesive means on the surface of the lens block, switch means operated by movement of said heating element out of said operative position, and means responsive to operation of said switch means causing said holding device to overcome the frictional force of said retaining means and carry said lens blank when so supported by the holding device into engagement with said adhesive means on the surface of the lens block, whereby the lens blank may be secured to the lens block while retaining its adjusted position.

14. An attachment for use with a lens blocking machine of the type embodying a vertically moveable lens blank holding device having gripping means for contacting and releasably retaining a lens blank in a preadjusted position, a lens block positioned adjacent to and in axial alignment with the holding device and carrying a heat softenable adhesive, and a heating element moveable into and out of operative position between the lens blank and the lens block, said attachment comprising spring means to be operatively assembled with the heating element for normally urging said heating element into inoperative position, a latch to be operatively assembled with said heating element for retaining the heating element in said operative position against the force of said spring means, an electrical circuit for use in connecting said heating element to a source of current, a switch in said circuit normally maintaining said circuit open and operated by movement of the heating element into operative position between the blank and adhesive to close the circuit and energize the heating element when the attachment is in use, a control device in said circuit and simultaneously energized by operation of said switch, said control device when so energized being operatively connected with the latch for causing said latch to release the heating element at the end of a predetermined time interval so that it will return to inoperative position from between the blank and adhesive, restraining means for normally retaining said holding device at a position spaced from the lens block supporting means against a force urging it to move to the lens block when the attachment is in use, and solenoid operated mechanism adapted to be responsive to the movement of the heating element to inoperative position when the attachment is in use causing said holding device to overcome the resistance of the restraining means to permit the lens blank to be moved into engagement with the adhesive on the lens block.

15. In a lens blocking machine of the type embodying a vertically moveable lens blank holding device having gripping means for contacting and retaining a lens blank in a preadjusted position, a lens block positioned adjacent to and in axial alignment with the lens blank and carrying a heat softenable adhesive and a heating device movable into and out of operative position between the lens blank and the lens block, the combination of resilient means assembled with said heating device for normally urging it into an inoperative position, latch means operatively associated with said heating device for retaining said heating device in its operative position between the lens blank and the lens block against the urging of said resilient means when moved into said operative position, an electrical circuit by which said heating device is connected to a source of current, a switch in said circuit and positioned to be ated upon by the heating device when moved into said operative position to permit energizing of the heating device by said circuit, a timing device responsive to the operation of said switch and having means associated with said latch means to cause it to release the heating device at the end of a predetermined timing cycle, restraining means assembled with said holding device for retaining it against a force urging it to move toward the lens block, and means positioned to be responsive to the movement of said heating device to said inoperative position acting upon said restraining means to release the lens blank holding device whereby said lens blank will be automatically carried by the holding device into engagement with the adhesive on the lens block when the heating device has been moved to inoperative position to secure the lens blank to the lens block with the lens blank being retained in its preadjusted position.

16. In a lens blocking machine of the type embodying a vertically moveable lens blank holding device having gripping means for contacting and releasably retaining a lens blank in a preadjusted position, a lens block positioned adjacent to and in axial alignment with the holding device and carrying a heat softenable adhesive, and a heating element moveable into and out of operative position between the lens blank and the lens block, the combination of spring means operatively assembled with the heating element for normally urging said heating element into inoperative position, a latch operatively assembled with said heating element for retaining the heating element in said operative position against the force of said spring means, an electrical circuit by which said heating element is connected to a source of current, a switch in said circuit normally maintaining said circuit open and positioned to be operated by the heating element when moved into operative position between the blank and adhesive to close the circuit and energize the heating element, a control device in said circuit and simultaneously energized by operation of said switch, said control device when so energized being operatively connected with the latch for causing said latch to release the heating element at the end of a predetermined time interval so that it will return to inoperative position from between the blank and adhesive, restraining means for normally retaining said holding device at a position spaced from the lens block supporting means against a force urging it to move to the lens block, and solenoid operated mechanism so positioned as to be responsive to the movement of the heating element to inoperative position causing said holding device to overcome the resistance of the restraining means to permit the lens blank to be moved into engagement with the adhesive on the lens block.

DANIEL P. BERNHEIM.
CARL G. SILVERBERG.

References Cited in the file of this patent

UNITED STATES PATENTS

| Number | Name | Date |
|--------|------|------|
| 537,014 | Burton | Apr. 9, 1893 |
| 2,031,380 | Mc Cabe | Feb. 18, 1936 |
| 2,191,952 | Blau | Feb. 27, 1940 |
| 2,286,212 | Corn | June 16, 1942 |
| 2,342,725 | Crepau | Feb. 29, 1944 |
| 2,463,669 | Wright | Mar. 8, 1949 |